July 15, 1969 S. B. GRAY ET AL 3,456,127

AMPLITUDE COMPARATOR

Filed June 18, 1965 2 Sheets-Sheet 1

INVENTORS
STEPHEN B. GRAY
GEORGE G. PICK

BY

Stanley M. Schurgin

ATTORNEY

July 15, 1969 S. B. GRAY ET AL 3,456,127

AMPLITUDE COMPARATOR

Filed June 18, 1965 2 Sheets-Sheet 2

INVENTORS
STEPHEN B. GRAY
GEORGE G. PICK

BY
Stanley M. Schurgin
ATTORNEY

United States Patent Office 3,456,127

Patented July 15, 1969

3,456,127
AMPLITUDE COMPARATOR

Stephen B. Gray, Newton, and George G. Pick, Lexington, Mass., assignors to Sylvania Electric Products Inc., a corporation of Delaware Filed June 18, 1965, Ser. No. 464,914
Int. Cl. H03k 5/20
U.S. Cl. 307—235 5 Claims

ABSTRACT OF THE DISCLOSURE

A comparator circuit for comparing a plurality of input signals of possibly differing amplitudes and for producing an output signal indicating the input signal having the greatest amplitude but only if the greatest signal is greater in amplitude than each of the other input signals by a predetermined amount. The input signals are received at respective base electrodes of a plurality of npn transistors, the collector electrodes being coupled through first resistors to a biasing voltage source and the emitter electrodes being coupled through second resistors to a constant current source. A like plurality of pnp transistors are provided having the base electrodes connected to the collector electrodes of the respective npn transistors, the emitter electrodes connected in common to a source of voltage potential, and the collector electrodes connected to respective output terminals.

This invention relates to electronic circuitry and more particularly to circuitry for comparing the amplitudes of a plurality of signals.

In signal processing systems it is often necessary to compare a plurality of signals and produce an output signal which is representative of the greatest of the compared signals. One well known circuit for providing this function is illustrated in FIG. 1 and comprises a plurality of transistors Q1, Q2 and Q3 each having its emitter connected to a common source of current I and each having its collector connected through respective resistors R1, R2 and R3, of equal value, to a common source of positive potential +V. The input signals to be compared are applied to respective bases of the transistors and the output signal is taken from the collector of the appropriate transistor. Only the transistor having the largest input signal applied to its base will conduct since the emitter of the conducting transistor will rise to almost the voltage level of the input signal thereby cutting off the emitter-base junctions of the other transistors. This circuit will provide the greatest-of function without regard to the relative magnitudes of the input signals. In other words, the largest of the input signals will be gated out irrespective of whether the next largest signal is slightly smaller than the largest signal or differing by a great amount. Such an absolute greatest-of decision is appropriate for some applications, but is not suitable for many other applications, such as in a correlator, employed, for example, in page reading systems. In these systems, data obtained from a character being read is correlated with a library of characters stored in memory to determine the identity of the character being read. The greatest correlation will identify the particular character. It has been found, however, that a measure of the difference between the largest to next largest correlation is important in properly deciding whether a correct correlation exists. If two close correlations exist, it is possible that the decision circuitry would not correctly decide whether one character or another is being read, and would render an arbitrary decision. In this event, it is more desirable to make no decision rather than make an arbitrary choice. The unread character can later be identified by other means. It is clear that present comparators, such as the one illustrated in FIG. 1, will gate out the greatest signal even though the next largest correlation were too close to the largest to give a reliable decision. It would be desirable, and it is an object of the present invention, to provide a comparator circuit which makes a greatest-of decision based upon the relative amplitude of the input signals as well as their absolute magnitudes.

Briefly, the invention according to its simplest aspect, comprises a modified form of the prior art circuit wherein emitter resistors are employed to provide thresholds which allow a decision to be made depending on the difference between the largest and next largest signal, as well as the absolute magnitude of the input signals.

The invention will be more fully described in the following detailed description, taken in conjunction with the drawings, in which.

Figure 1:
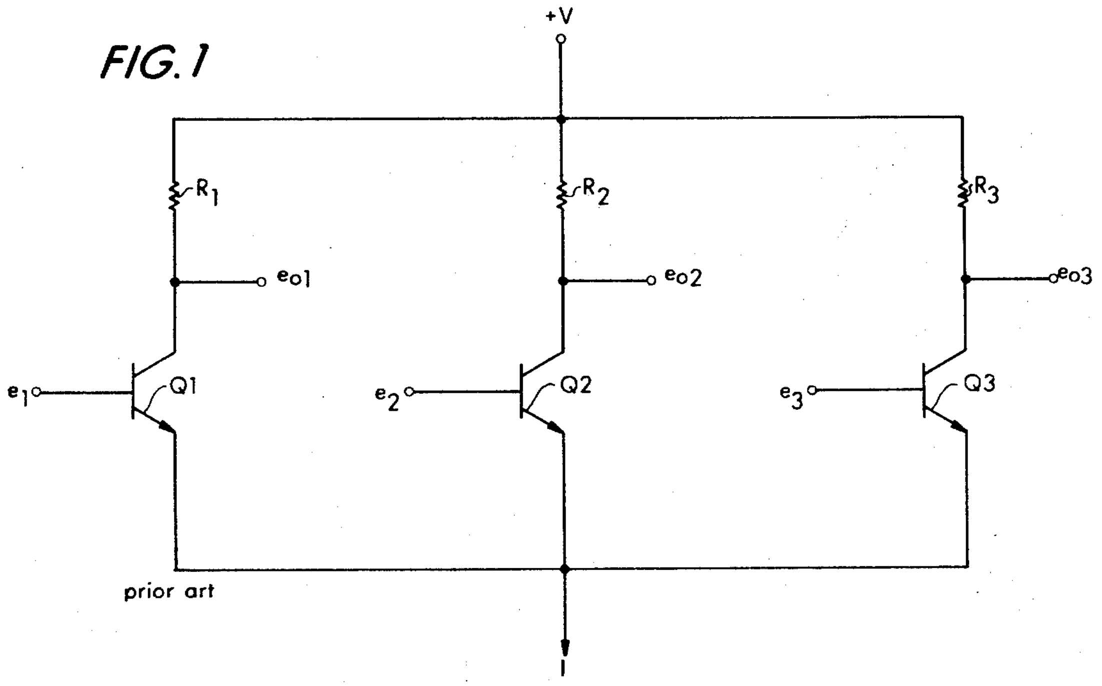
FIG. 1 is a schematic diagram of a prior art comparator circuit, to which reference has already been made.
Figure 2:
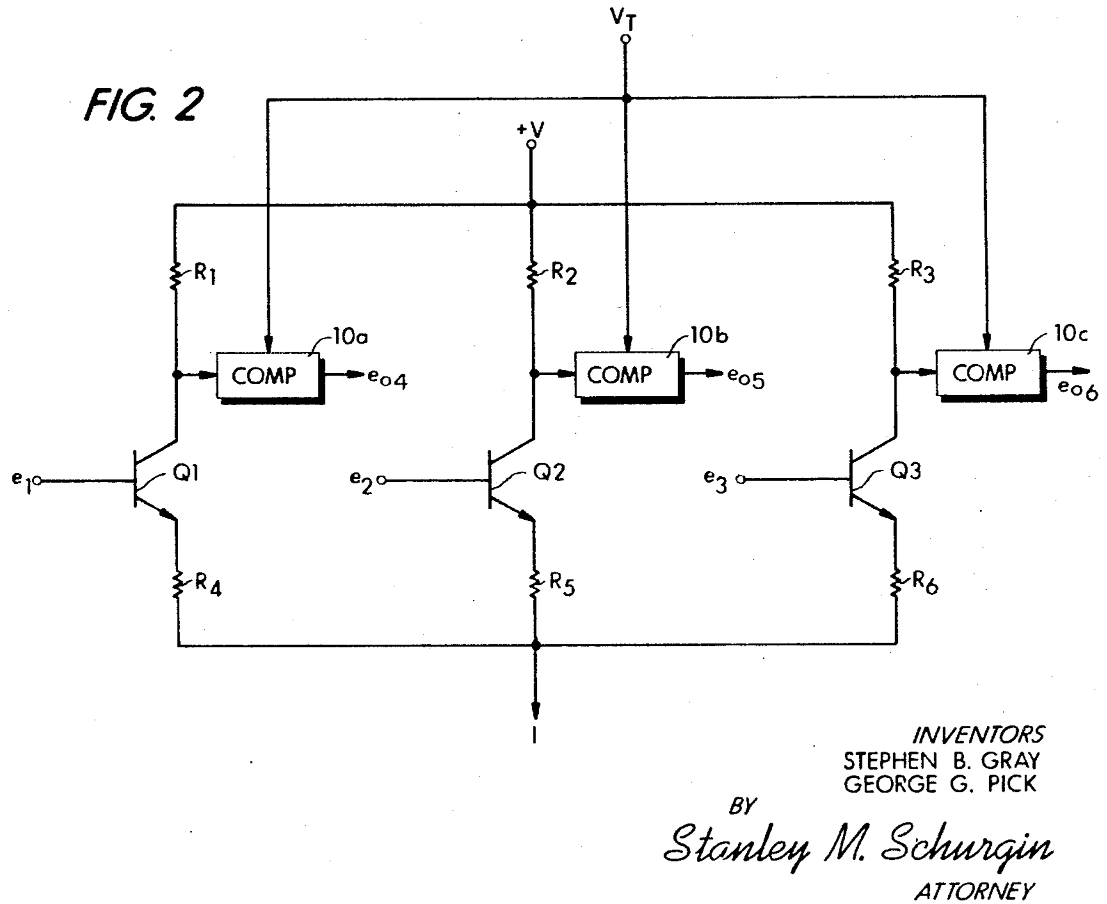
FIG. 2 is a schematic diagram of a comparator circuit according to the present invention.

Referring to FIG. 2, it is seen that the prior art circuit of FIG. 1 is modified by the addition of emitter resistors R4, R5 and R6, of equal value, connected between respective emitters and the current source I, and comparators 10*a*, 10*b* and 10*c*, each having one input connected to the collector of respective transistors Q1, Q2 and Q3, and the other input connected to a source of reference potential $V_T$. Each comparator 10*a*, 10*b* and 10*c* is designed to produce an output if the input signal from the collector of the corresponding transistor is less than or equal to the reference potential $V_T$. Conversely, no output signal is produced by the comparator if the input signal is greater than $V_T$. The instant circuit is more versatile and capable of operation in a manner not possible with the conventional circuit. It should be noted that although three stages are illustrated, any number of stages can be employed, as the situation requires.

As with the circuit of FIG. 1, an input signal having the largest magnitude causes its associated transistor to conduct and an output signal to appear at the collector of that transistor. Unlike the conventional circuit, however, other input signals above a given threshold will also produce an output, due to the presence of the emitter resistors, and the thresholding allowed by comparators 10*a*, 10*b*, 10*c* and reference source $V_T$. Two threshold levels are set to allow proper circuit operation, an absolute threshold $V_A$ which determines the level below which no input signals are applied to the circuit, and a difference threshold $V_T$ which determines the minimum difference between input signals which will allow an output. The absolute threshold can be provided, for example, by suitable thresholding circuits (not shown) at the input to each stage which will pass only signals above a predetermined level, or by a threshold control stage (not shown) in parallel with the comparator stages. This circuit is capable of comparing a plurality of input signals and producing a variety of outputs, one, two, three or more, depending upon the decision process which is determined by the value of the threshold voltage $V_T'$. For example, assume that the circuit of FIG. 2 should produce an output if any input signal exceeded one third the total input, and the input signals $e_1$, $e_2$ and $e_3$ had magnitudes of 30, 30 and 40 units, respectively. Signals $e_1$ and $e_2$ would not produce an output since they are below the theshold, but $e_3$, being above the threshold, would cause an output $e_{06}$. If input signals of 40, 40 and 20 units were applied to the circuit, two outputs, $e_{04}$ and $e_{05}$, would occur due to the 40 unit inputs $e_1$ and $e_2$.

When the circuit is employed in the page reading correlator, such as discussed hereinabove, only two input signals are operative in making an amplitude comparison. All other input signals are sufficiently small to maintain the corresponding transistors cut off. Thus, two input signals are competing in the decision process, and only the two corresponding transistors are conducting.

It can be shown that, if only two transistors are conducting, the output signal from the transistor having the largest input is related to the difference between the larges input and the next largest input. By suitable choice of the reference potential $V_T$ a particular reference range can be chosen such that competing input signals within this selected range will produce no output, whereas signals differing by an amount greater than the selected difference will cause an output signal to appear. The value of $V_T$ can be calculated from the expression $$V_T=V-\frac{IR}{2}-\frac{V_D}{2}$$

where:

V is the positive supply voltage
I is the total current
R is the emitter resistance
$V_D$ is difference between largest and next largest input signal.

In operation then, one of the comparators will produce an output signal when the difference between a pair of competing input signals is at least as great as the difference range $V_D$. Thus, a greatest-of decision is made when the largest signal is a given amount greater than the other input signals, while no decision is made when a pair of input signals closely related in magnitude are competing.

Figure 3:
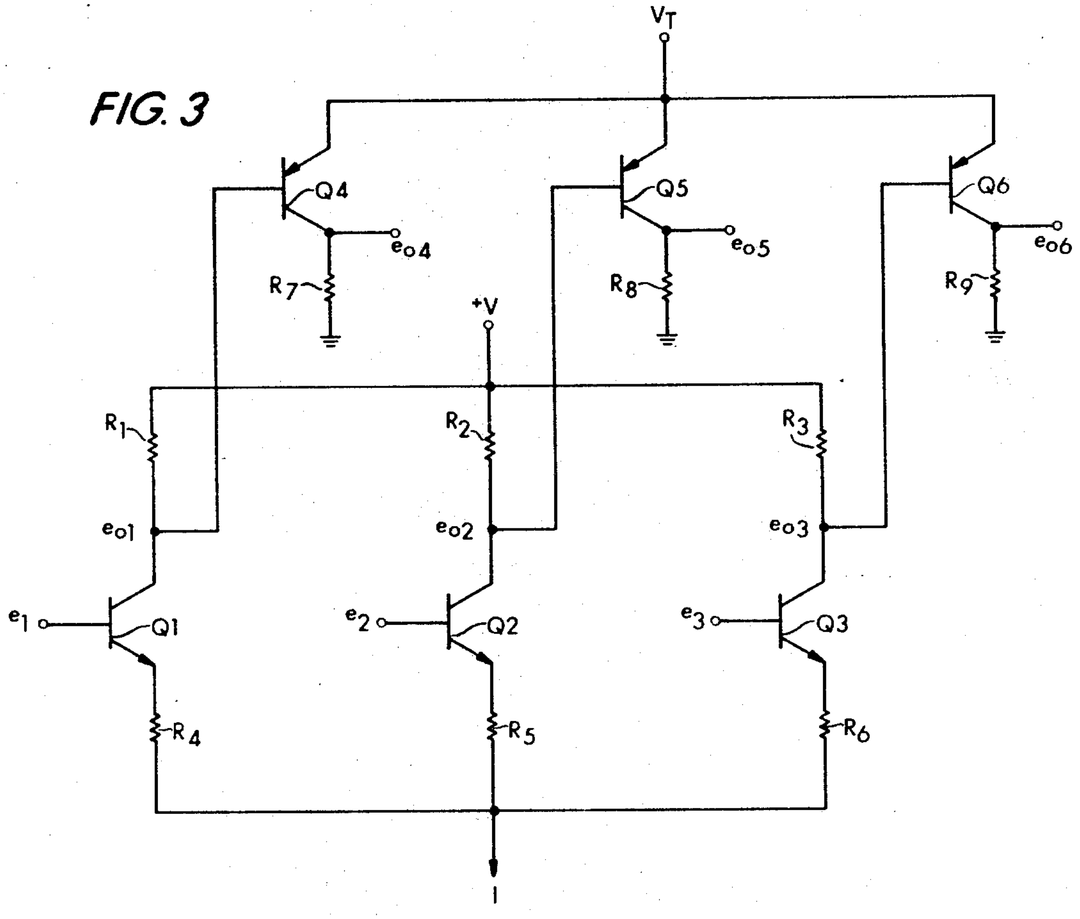
FIG. 3 is a schematic diagram of a further embodiment of the present invention.

Comparators 10*a*, 10*b* and 10*c* can be implemented in a variety of well known ways, one being illustrated in FIG. 3. The output of each transistor stage Q1, Q2 and Q3, is applied to respective bases of transistors Q4, Q5 and Q6, the collectors of which are grounded through resistors R7, R8 and R9, respectively, and the emitters of which are connected to a voltage source $V_T$. The portion of the circuit including transistors Q4, Q5 and Q6 will be recognized as a comparator circuit of the type illustrated in FIG. 1, with PNP transistors being employed to suit the polarity of the energizing signals. In operation, the largest input signal, say $e_1$, causes transistor Q1 to conduct, producing an output voltage $e_{01}$ which is applied to the base of transistor Q4. The next largest input signal, say $e_2$, causes transistor Q2 to conduct causing its output signal $e_{02}$ to be applied to the base of transistor Q5. An output signal $e_{04}$ will appear at the collector of Q4 if the difference between input signals $e_1$ and $e_2$ is greater or equal to the difference range $V_D$ established by voltage $V_T$. Conversely, no output signal will appear when the difference between input signals is less than the difference range $V_D$. Thus, this circuit is especially useful in the above-described correlation system to determine whether a correct correlation exists by measuring the difference between the two largest correlations and basing the thresholding decision on the magnitude of this difference.

From the foregoing, it is evident that a circuit has been provided which compares a group of input signals based upon the relative as well as the absolute magnitude of the signals and produces an output signal indicative of this comparison. The invention is not to be limited by what has been particularly shown and described except as indicated in the appended claims.

What is claimed is:

1. A comparator circuit comprising, a first purailty of transistors each having a base, an emitter and a collector, each collector being connected through a respective resistor to a common source of potential, each emitter being connected via a respective resistor to a common source of current, a plurality of sources of input signals each connected to the base of a respective transistor, a second plurality of transistors each having a base, an emitter and a collector, each base of said second plurality being connected to the collector of said first plurality, each collector of said second plurality being connected through a respective resistor to ground, and each emitter of said second plurality being connected to a common source of reference potential.

2. A comparator circuit in acordance with claim 1 wherein the first plurality of transistors are of a first conductivity type and the second plurality of transistors are of the opposite conductivity type.

3. A comparator circuit comprising, a constant current source, a plurality of first circuit means each having a separate input connection adapted to receive an input signal and each having a common connection to said constant curret source, an output connection from each of the plurality of first circuit means, each of the plurality of first circuit means being operable in response to an input signal received at the corresponding input connection to produce an output signal at the corresponding output connection of a value related to the value of the input signal, an energizing means having a predetermined voltage, and a like plurality of second circuit means each connected to the energizing means, each of the plurality of second circuit means being connected to a respective output connection from the first circuit means, each of said second circuit means being operable to produce an output signal when the voltage at the respective output connection from the corresponding first circuit means exceeds the predetermined voltage of the energizing means, and wherein the parameters of the comparator circuit in combination with the constant current source being adjusted so that an output signal from a first circuit means which will produce an output signal from the corresponding second circuit means occurs only when the current through the first circuit means having the greatest voltage amplitude input applied at the input connection thereto differs from the currents through each of the other first circuit means by an amount sufficient to produce a voltage at only the output connection from the first circuit means having the greatest voltage amplitude input applied at the input connection thereto which exceeds the predetermined voltage of the energizing means.

4. A comparator circuit in accordance with claim 3 wherein each of the plurality of first circuit means further includes
- a transistor of a first conductivity type having a base connected to an input connection, a collector connected to an output connection, and an emitter;
- a first resistance connected to the collector;
- a biasing means connected to the first resistance for biasing the transistor to a predetermined condition; and
- a second resistance connected between the emitter and the constant current source; and each of the plurality of second circuit means comprises
- a normally non-conducting transistor of a conductivity type opposite to the conductivity type of the transistors included in the plurality of first circuit means and having a base connected to the collector of a corresponding transistor of the first conductivity type, an emitter connected to the energizing means, and a collector; and
- an output terminal connected to the collector;

each of the normally non-conducting transistors being capable of being biased into conduction when the voltage at the collector of the corresponding transistor of the first conductivity type is less than the voltage of the energizing means whereby an output signal is produced at the corresponding output terminal.

5. A comparator circuit in accordance with claim 4 wherein the transistors of the first conductivity type are npn transistors and the transistors of the opposite conductivity type are pnp transistors.

References Cited

UNITED STATES PATENTS

| | | | |
|---|---|---|---|
| 3,041,469 | 6/1962 | Ross | 307—235 |
| 3,054,910 | 9/1962 | Bothwell | 307—235 |
| 3,092,732 | 6/1963 | Milford | 307—235 |
| 3,358,157 | 12/1967 | Shearme | 307—235 |

JOHN S. HEYMAN, Primary Examiner

U.S. Cl. X.R.

307—255, 237